April 5, 1966 R. L. HOLT 3,244,768
CATALYTIC POLYMERIZATION OF PROPYLENE
Filed Oct. 19, 1964
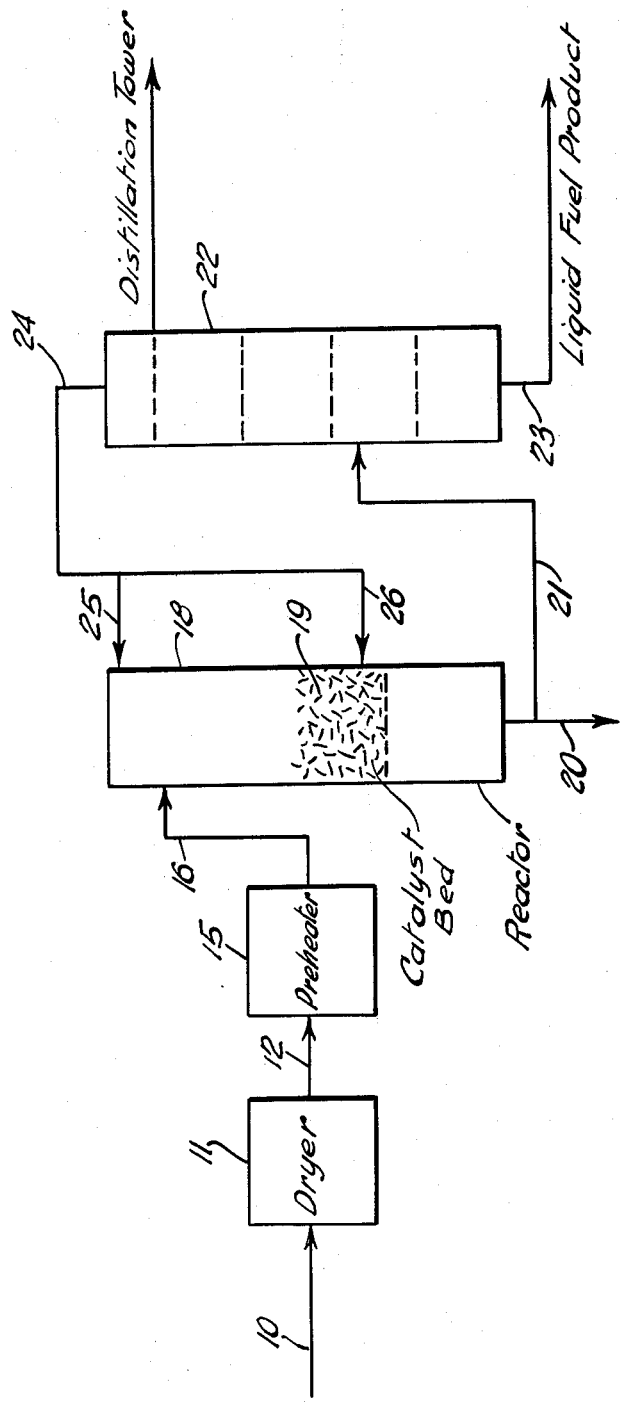

3,244,768
CATALYTIC POLYMERIZATION OF PROPYLENE
Robert L. Holt, Middleton, La., assignor to Texaco Inc., New York, N.Y., a corporation of Delaware
Filed Oct. 19, 1964, Ser. No. 404,899
4 Claims. (Cl. 260—683.15)

This invention relates to the polymerization of propylene. In its more specific aspect, this invention relates to an improved process whereby propylene in the vapor phase is continuously polymerized over a fixed bed catalyst to produce products in the gasoline and jet fuel boiling range. This application is a continuation-in-part of a commonly assigned application, S.N. 99,049, filed on March 29, 1961, now abandoned.

The polymerization of unsaturated aliphatic hydrocarbons, such as an olefin or mixtures of olefins, with a suitable catalytic material to form compounds of higher molecular weight is well known. Catalysts commonly employed for such polymerization reactions include metal halides, alkylmetals and metal oxides, including heterogeneous mixtures thereof. There are a number of serious drawbacks associated with these prior art processes. For example, many polymerization processes are conducted in batches or intermittently with the result that they do not lend themselves to the efficiencies of continuous operation. Another is that in the production of higher molecular weight polymers the active catalyst component is quickly rendered inactive due to polymer coatings that seal off the active polymerization sites. Still another major disadvantage of many processes is that it is difficult and costly to separate or recover the catalyst which is admixed or dissolved in the polymer product.

A novel method has now been discovered whereby propylene may be continuously polymerized to products in the gasoline and jet fuel boiling ranges which overcomes the disadvantages of the prior art processes.

In accordance with this invention, propylene in the gaseous phase and at a temperature above its critical temperature is continuously contacted with a solid fixed-bed of catalyst consisting of a titanium tetrachloride-alkyl aluminum complex on a calcium alumino-silicate molecular sieve under conditions producing essentially a liquid polymer boiling in the gasoline-jet fuel boiling range with continuous removal of the fuel from the fixed-bed in the reaction zone.

The drawing illustrates one mode of operation for the process of this invention.

In the drawing, propylene is delivered through line 10 to a dryer 11 in which the charge stock is substantially freed of water. The dried charge is passed through line 12 into preheater 15 in which the charge stock is preheated to the desired temperature and delivered through line 16 into polymerization reactor 18. The gaseous propylene is passed over the supported catalyst bed 19 wherein the propylene fed is substantially polymerized to polymers such as di-, tri-, and tetra- and lower boiling polymers of propylene in the gasoline and jet fuel boiling ranges. The substantially completely liquified product is withdrawn through line 20. Optionally, the product is passed into distillation tower 22 through line 21. Unpolymerized propylene is taken off overhead through line 24 and recycled to the polymerization reactor. In the event that fuels boiling in the jet fuel boiling range are desired as the principal product, the low boiling polymers, such as diisobutylene, may also be taken off overhead and recycled back to the polymerization zone. The recycle stream may be introduced into the polymerization reactor at different points indicated by lines 25 and 26 in order to control the amount of additional polymerization desired for the recycle stream.

In general, the polymerization catalyst of my invention consists essentially of the reaction products resulting from the reaction between triisobutylaluminum and titanium tetrachloride formed in situ on and within a suitable carrier or support. The propylene is contacted with the resulting catalyst material under suitable polymerization conditions, and the higher molecular weight polymer product is recovered from the reaction. The polymerization reaction employing my process is adaptable to a range of operating conditions for obtaining a polymer in the gasoline or jet fuel boiling range, as described hereinafter in greater detail.

The catalyst useful in the present invention is prepared by forming in situ on a suitable carrier the reaction products resulting from the reaction between triisobutylaluminum and titanium tetrachloride. A uniform zone of catalyst may be readily deposited on the carrier or within the carrier, by contacting with the carrier a solution containing one of the materials used in forming the catalyst the solution being desirably maintained at about room temperature. The second of the said materials used in the preparation of the catalyst is reacted with the absorbed material as by contacting the carrier having the absorbed material thereon with a solution of the second material. Thus, titanium tetrachloride, which is a liquid at room temperature and atmospheric pressure, may be dissolved in a suitable solvent or diluent, and the solution containing the titanium tetrachloride is then contacted with the carrier for a sufficient period of time usually ranging from about 2 minutes to 3 hours, and more preferably from 15 minutes to 1 hour. After sufficient time has elapsed for an adequate amount of titanium tetrachloride to become absorbed by the carrier, the carrier having titanium tetrachloride absorbed thereon is separated from the solvent by conventional methods such as filtering, decanting or the like. Any solvent retained by the carrier may be removed by evaporation which may be conducted at an elevated temperature, and under vacuum, where desired or necessary. Similarly, triisobutylaluminum, also normally a liquid is dissolved in a suitable solvent, and the solution is contacted with the carrier, having absorbed thereon titanium tetrachloride, for a desired period of time usually ranging from about 2 minutes to 3 hours and more preferably from 15 minutes to 1 hour. The absorbed titanium tetrachloride reacts with the triisobutylaluminum and the resulting solid reaction product or products is formed on and in the carrier. The carrier with the resulting reaction products formed thereon comprising the supported catalyst is separated from the solvent. Any solvent retained by the carrier may be removed by evaporation. Where desired, the above-described sequence of forming the catalyst on the carrier may be reversed in that the triisobutylaluminum may be absorbed first by the carrier which in turn is then contacted with a solution of titanium tetrachloride. In either case, when the titanium tetrachloride and triisobutylaluminum react, the catalyst is formed in situ on the carrier. In this manner a relatively uniform deposit of catalyst is dispersed or absorbed on the carrier. It should be understood that in the preparation of the catalyst, the reactants and the resulting products are adsorbed on the surface of the carrier and also are absorbed in the pores of the carrier. Therefore, in describing and claiming my invention, although mention may be made of absorption and adsorption, both are included, and the catalyst is thus formed on the carrier and within the carrier.

Suitable solvents or diluents for both the triisobutylaluminum and titanium tetrachloride include the saturated hydrocarbons such as pentanes, hexanes, heptanes, etc. Any saturated hydrocarbon as solvent remaining on the carrier may be removed by evaporation desirably at an elevated temperature of about 350° F. or as high as 450° F. and/or under a vacuum, the combination of temperature and pressure conditions being such as not to remove or distill any ingredients of the catalyst.

The proportion of triisobutylaluminum employed to titanium tetrachloride can be varied and may range from about 0.2 mol to about 12 mols of triisobutylaluminum per one mol of titanium tetrachloride. More preferably, triisobutylaluminum is employed in proportions between about 1 to 3 mols per one mol of titanium tetrachloride. The relative proportions of support to the active ingredients of the catalyst is not critical and may be varied throughout a relatively wide range. The optimum proportions can readily be determined in specific instances by experimentation by one skilled in the art.

The catalyst material may be deposited on any number of known carriers. These may include alumina, silica, kieselguhr, alumino-silicates, magnesia-silicates, and the like, preferably and conveniently in the form of granules or pellets. Alumino-silicates, such as calcium aluminosilicates and commonly referred to as molecular sieve adsorbents are especially desirable. A carrier in pellet form, measuring approximately not less than about $\frac{1}{16}$-inch in its minimum dimension provides a particularly desirable support which is easily filterable or otherwise removable and on which may be formed a stable and active catalyst.

Propylene in the gas phase is polymerized in accordance with the present invention using my catalyst. Gas phase polymerization is particularly outstanding in that it permits ready control of the reaction conditions and the molecular weight of the product.

The polymerization process is conducted within a temperature of from about 300° to 600° F., and more preferably within a range of 390° to 550° F. which is well above the critical temperature of propylene. Relatively low pressures can be employed in the process which may include, under suitable conditions, pressures as low as atmospheric pressure or lower. However, the pressure may vary over a wide range and may be as high as 5000 p.s.i.g., or higher. A generally useful and desirable pressure range is between about 250 p.s.i.g. and 3000 p.s.i.g., preferably between about 1000 p.s.i.g., and 1500 p.s.i.g. The contact time or space velocity employed in the polymerization process will be selected with reference to the other process conditions and catalyst. A suitable feed rate for the gaseous propylene expressed as liquid hourly space velocity may range from about 0.2 v./hr./v., preferably from about 0.5 to 3 v./hr./v. but may be varied to obtain the desired results. Thus, it should be understood that the various operating conditions for the process may be varied, but optimum conditions can be readily ascertained by experimentation by one skilled in the art.

The polymers produced in the catalyst polymerization of my process distill within the gasoline-jet fuel boiling range and therefore are particularly suitable for use in jet and motor fuels. The polymer product thus produced has a boiling point in the range of from about 100° to 500° F., with the major portion boiling between 150° and 400° F., and has from 6 carbon atoms to 15 carbon atoms per molecule.

The following example further illustrates the catalytic polymerization of my invention:

The catalyst was prepared under an atmosphere of dry nitrogen by initially dissolving 125 grams of titanium tetrachloride in 375 grams of n-pentane. The resulting solution contained 25% by weight titanium tetrachloride. 500 milliliters (approximately 340 grams) of calcium alumino-silicate pellets, manufactured by Linde Air Products Company and designated type 5A molecular sieve and measuring approximately $\frac{1}{16}$-inch in diameter, were added to the solution. After about 30 minutes, the solution was drained from the pellets, and the n-pentane solvent was allowed to evaporate at room temperature and atmospheric pressure.

Similarly, a 25% by weight solution of the triisobutylaluminum in n-pentane was prepared by dissolving 125 grams of triisobutylaluminum in 375 grams of the solvent. The pellets, having adsorbed thereon titanium tetrachloride from the previous treatment, were submerged in the solution of triisobutylaluminum for 30 minutes, again drained and the solvent allowed to evaporate.

350 milliliters of the prepared supported catalyst was placed in a one liter autoclave, and 1075 grams of propylene was added continuously under pressure. A liquid polymer product was withdrawn continuously from the bottom drain of the reactor. The polymerization reaction was conducted at 450° F., 1000 p.s.i.g. and at an average liquid space velocity of 1 v./hr./v. The total yield of liquid polymer was 823 grams, thus resulting in a conversion of 76.5% by weight. The polymer had a boiling point range of 146° to 460° F., a gravity of 54.6° API, and exhibited valuable properties as a fuel.

Having described my invention, I claim:

1. A process for the polymerization of propylene with a titanium tetrachloride-trialkyaluminum complex formed on a calcium alumino-silicate molecular sieve support which comprises passing the propylene in vapor phase at a temperature of 390° to 550° F. into a reaction zone in contact with a solid fixed bed of a calcium aluminosilicate molecular sieve containing adsorbed titanium tetrachloride-trialkylaluminum complex catalyst under conditions producing essentially a liquid polymer boiling in the gasoline-jet fuel boiling range, and continuously removing from the said fixed bed in the reaction zone during the progress of the reaction the said liquid polymer so produced.

2. A process according to claim 1 in which said polymerization is conducted under a pressure from about 1000 to 1500 p.s.i.g.

3. A process according to claim 1 in which said supported catalyst is formed by the reaction between trialkylaluminum and titanium tetrachloride employing a molar ratio in the range of 1:1 to 3:1 respectively.

4. A process for the polymerization of propylene with a titanium tetrachloride-triisobutylaluminum complex formed on a calcium alumino-silicate molecular sieve support which comprises passing the propylene in vapor phase at a temperature of 390° to 550° F. into a reaction zone in contact with a solid fixed bed of a calcium alumino-silicate molecular sieve containing adsorbed titanium tetrachloride-triisobutylaluminum complex catalyst under conditions producing essentially a liquid polymer boiling in the gasoline-jet fuel boiling range and continuously removing from the said fixed bed in the reaction zone during the progress of the reaction the said liquid polymer so produced.

References Cited by the Examiner

UNITED STATES PATENTS 3,008,943 11/1961 Guyer _____ 260—683.15
3,068,306 12/1962 Hay et al. _____ 260—683.15

PAUL M. COUGHLAN, *Primary Examiner.*